US008423454B2

(12) United States Patent
Chen et al.

(10) Patent No.: US 8,423,454 B2
(45) Date of Patent: Apr. 16, 2013

(54) DETERMINING LEADING INDICATORS

(75) Inventors: Jie Chen, Chappaqua, NY (US);
Timothy John Breault, Huntersville, NC (US); Fernando Cela Diaz, New York, NY (US); William Anthony Nobili, Charlotte, NC (US); Sandi Setiawan, Charlottle, NC (US); Harsh Singhal, Charlotte, NC (US); Agus Sudjianto, Charlotte, NC (US); Andrea Renee Turner, Rock Hill, SC (US); Bradford Timothy Winkelman, Wilmington, DE (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 13/344,709

(22) Filed: Jan. 6, 2012

(65) Prior Publication Data
US 2012/0173399 A1 Jul. 5, 2012

Related U.S. Application Data

(63) Continuation-in-part of application No. 12/651,666, filed on Jan. 4, 2010, and a continuation-in-part of application No. 12/541,728, filed on Aug. 14, 2009.

(51) Int. Cl.
*G06Q 40/00* (2012.01)
(52) U.S. Cl.
USPC .......................................................... 705/38
(58) Field of Classification Search ........................ None
See application file for complete search history.

(56) References Cited

U.S. PATENT DOCUMENTS

| 6,061,662 | A  | * | 5/2000 | Makivic ...................... 705/36 R |
| 6,866,973 | B2 |   | 3/2005 | Maehara |
| 6,907,403 | B1 |   | 6/2005 | Klein et al. |
| 7,349,878 | B1 | * | 3/2008 | Makivic .......................... 705/37 |
| 7,653,593 | B2 |   | 1/2010 | Zarikian et al. |
| 7,689,494 | B2 | * | 3/2010 | Torre et al. .................. 705/36 R |
| 7,991,666 | B2 |   | 8/2011 | Haggerty et al. |

(Continued)

OTHER PUBLICATIONS

Spectral Iterative Estimation of Tempered Stable Stochastic Volatility Models and Option Pricing, Google Scholar C Favero, J Li, F Ortu—2008—economia.uniroma2.it http://www.economia.uniroma2.it/conference/Public/1/File/Li%20Junye.pdf.*

(Continued)

*Primary Examiner* — Bruce I Ebersman
(74) *Attorney, Agent, or Firm* — Michael A. Springs; Padowithz Alce; Moore & Van Allen, PLLC

(57) ABSTRACT

Embodiments of the present invention relate to methods and apparatuses for determining leading indicators and/or for modeling one or more time series. For example, in some embodiments, a method is provided that includes: (a) receiving first data indicating the value of a total income amount for a plurality of consumers over a period of time; (b) receiving second data indicating the value of a total debt amount for a plurality of consumers over a period of time; (c) selecting a consumer leverage time series that compares the total income amount to the total debt amount over a period of time; (d) modeling the consumer leverage time series based at least partially on the first and second data; (e) determining, using a processor, the value of the cycle component for a particular time; and (f) outputting an indication of the value of the cycle component for the particular time.

19 Claims, 9 Drawing Sheets

U.S. PATENT DOCUMENTS

| | | | |
|---|---|---|---|
| 8,005,740 B2 * | 8/2011 | Arnott et al. | 705/36 R |
| 8,099,356 B2 * | 1/2012 | Feinstein et al. | 705/38 |
| 2006/0212386 A1 | 9/2006 | Willey et al. | |
| 2007/0203827 A1 * | 8/2007 | Simpson et al. | 705/38 |
| 2008/0222015 A1 | 9/2008 | Megdal et al. | |
| 2009/0144160 A1 | 6/2009 | Haggerty et al. | |
| 2009/0327036 A1 | 12/2009 | Ports et al. | |
| 2010/0076813 A1 | 3/2010 | Ghosh et al. | |
| 2011/0047069 A1 * | 2/2011 | Mustafa et al. | 705/38 |

OTHER PUBLICATIONS

Model of Capital Structure when Earnings are Mean-RevertingAuthor(s): Steven RaymarReviewed work(s):Source: The Journal of Financial and Quantitative Analysis, vol. 26, No. 3 (Sep. 1991), pp. 327-344Published by: University of Washington School of Business AdministrationStable URL: http://www.jstor.org/stable/2331210.*

Residential Mortgage default risk and the loan to value ratio—Jim Wong, Laurence Fung, Tom Fong, Angela Sze of the Research Dept. Dec. 2004, Hong Kong Monetary Authority Quarterly Bulletin, 11 pages.*

U.S. Appl. No. 12/541,728, filed Aug. 14, 2009.

U.S. Appl. No. 12/651,666, filed Jan. 4, 2010.

Azevedo, Joao Valle et al. "Tracking Growth and the Business Cycle: A Stochastic Common Cycle Model for the Euro Area"; Banco De Portugal Economic Research Department of Free University, Amsterdam; Sep. 8, 2003; pp. 1-25.

* cited by examiner

DETERMINING LEADING INDICATORS

CROSS-REFERENCE TO RELATED APPLICATIONS

The present application claims priority to and is a continuation-in-part of U.S. patent application Ser. No. 12/651,666, filed on Jan. 4, 2010, entitled "Credit-Approval Decision Models," the entire disclosure of which is incorporated herein by reference. The present application also claims priority to and is a continuation-in-part of U.S. patent application Ser. No. 12/541,728, filed on Aug. 14, 2009, entitled "Consumer Leverage Modeling," the entire disclosure of which is incorporated herein by reference.

BACKGROUND

In the context of financial services, a non-collectable is a declaration by a creditor, such as a credit-card issuer, that an amount of debt is unlikely to be collected. For example, credit-card issuers often make the decision to declare an uncollected credit-card debt after six months of non-payment as non-collectable. Net non-collectable is the gross amount of debt declared non-collectable, less recoveries collected from earlier non-collectibles. For example, if a credit-card holder fails to repay on his $10,000 credit-card balance, the credit-card issuer can record a $10,000 loss. However, if the credit-card issuer later collects $3,000 from the credit-card holder failing to repay, then the net non-collectable charge off on the debt is $7,000, not $10,000 as originally recorded.

In an effort to reduce non-collectibles, financial institutions often rely on economic indicators. More credit is issued to consumers when economic indicators are good. Less is issued when they are bad. Methods for developing and applying economic indicators continuously evolve and vary from institution to institution and from financial market to financial market.

Generally speaking, an economic indicator is a statistic used to analyze characteristics of a particular market. Economic indicators fall into three broad categories: lagging, coincident, and leading. Lagging indicators are economic indicators that react slowly to economic changes, and therefore provide little predictive value. Generally speaking, lagging indicators follow an event because they are historical in nature. Lagging indicators demonstrate how well a market has performed in the past. This gives economists a chance to review their predictions and make better forecasts. For example, the unemployment rate is traditionally characterized as a lagging indicator. This is because unemployment represents previous personnel decisions and, as such, always lags behind current market conditions. For example, during the mid-1990s there was a spike in consumer credit losses in the United States, despite decreasing unemployment. Profit is another exemplary lagging indicator because it reflects historical performance. Customer satisfaction is another economic indicator that indicates historical performance.

Coincident indicators are economic indicators that change at approximately the same time and in the same direction as the relevant market. As such, they generally provide information about the current state of the market. For example, personal income, gross domestic product (GDP), and retail sales are coincident indicators. Coincident indicators are often used to identify, after the fact, the dates of peaks and troughs in the economy or sectors of the economy.

Leading indicators are economic indicators that predict future changes in the market. A leading indicator is one that changes before the market changes. Examples of leading indicators include stock prices, which often improve or worsen before a similar change in the market. Other leading indicators include the index of consumer expectations, building permits, and money supply.

Known economic indicators and methods of applying those economic indicators are not yet reliable or accurate enough to consistently predict changes in consumer non-collectibles. Such predictions would enable financial institutions to save billions of dollars by effectively and timely issuing and retracting credit. For example, financial institutions could issue more credit when net non-collectibles are predicted to decrease and issue less when net non-collectibles are predicted to increase.

SUMMARY OF SELECTED EMBODIMENTS OF THE PRESENT INVENTION

In general terms, embodiments of the present invention relate to methods and apparatuses for determining leading indicators and/or modeling one or more time series. For example, some embodiments of the present invention provide a method for modeling a consumer leverage time series. In some of these embodiments, the method includes receiving first data indicating the value of a total income amount for a plurality of consumers over a period of time, and receiving second data indicating the value of a total debt amount for a plurality of consumers over a period of time. The method further includes selecting a consumer leverage time series that compares the value of the total income amount to the value of the total debt amount over a period of time. In addition, the method includes modeling, based at least partially on the first and second data, the consumer leverage time series, where the modeling includes: (i) modeling a trend component of the consumer leverage time series; and (ii) modeling a cycle component of the consumer leverage time series. In some embodiments, the method also includes determining, using a processor, the value of the cycle component for a particular time, and/or outputting an indication of the value of the cycle component for the particular time.

Other embodiments of the present invention provide an apparatus that includes a communication interface, a processor, and an output device. In some of these embodiments, the communication interface is configured to receive first data indicating the value of a total income amount for a plurality of consumers over a period of time, and receive second data indicating the value of a total debt amount for a plurality of consumers over a period of time. In some embodiments of the apparatus, the processor is operatively connected to the communication interface and is configured to select a consumer leverage time series that compares the value of the total income amount to the value of the total debt amount over a period of time. The processor may also be configured to model, based at least partially on the first and second data, the consumer leverage time series by: (i) modeling a trend component of the consumer leverage time series; and (ii) modeling a cycle component of the consumer leverage time series. In some cases, the processor is further configured to determine the value of the cycle component for a particular time. Further, in some embodiments of the apparatus, the output device is operatively connected to the processor and is configured to output an indication of the value of the cycle component for the particular time.

Still other embodiments of the present invention provide a computer program product having a non-transitory computer-readable medium, where the non-transitory computer-readable medium includes one or more computer-executable program code portions. In some embodiments, the one or more computer-executable program code portions, when executed by a computer, cause the computer to: (a) receive first data indicating the value of a total income amount for a plurality of consumers over a period of time; (b) receive second data indicating the value of a total debt amount for a plurality of consumers over a period of time; (c) select a consumer leverage time series that compares the value of the total income amount to the value of the total debt amount over a period of time; (d) model, based at least partially on the first and second data, the consumer leverage time series, where the computer models the consumer leverage time series by: (i) modeling a trend component of the consumer leverage time series; and (ii) modeling a cycle component of the consumer leverage time series. In some embodiments, the one or more computer-executable program code portions are further executable to: (e) determine the value of the cycle component for a particular time; and (f) output an indication of the value of the cycle component for the particular time.

Other embodiments of the present invention provide a method for modeling a leading time series, where changes in that leading time series serve as a logical leading indicator for changes in a target time series. In some embodiments, the method includes selecting a target time series that tracks the value of a target economic variable over a period of time. The method also includes selecting a leading time series that tracks the value of a leading economic variable over a period of time, such that changes in the leading time series serve as a logical leading indicator for changes in the target time series. The method further includes receiving first data indicating the value of the target time series over a period of time, and receiving second data indicating the value of the leading time series over a period of time.

In addition, the method includes determining, based at least partially on the first data, a period for the target time series. The method also includes modeling, based at least partially the second data, the leading time series, where the modeling includes: (i) modeling a trend component of the leading time series; and (ii) modeling a cycle component of the leading time series, such that the cycle component has the same period as the period for the target time series. In some embodiments, the method further includes determining, using a processor, a value of the cycle component for a particular time, and/or outputting an indication of the value of the cycle component for the particular time.

BRIEF DESCRIPTION OF THE DRAWINGS

Figure 1:
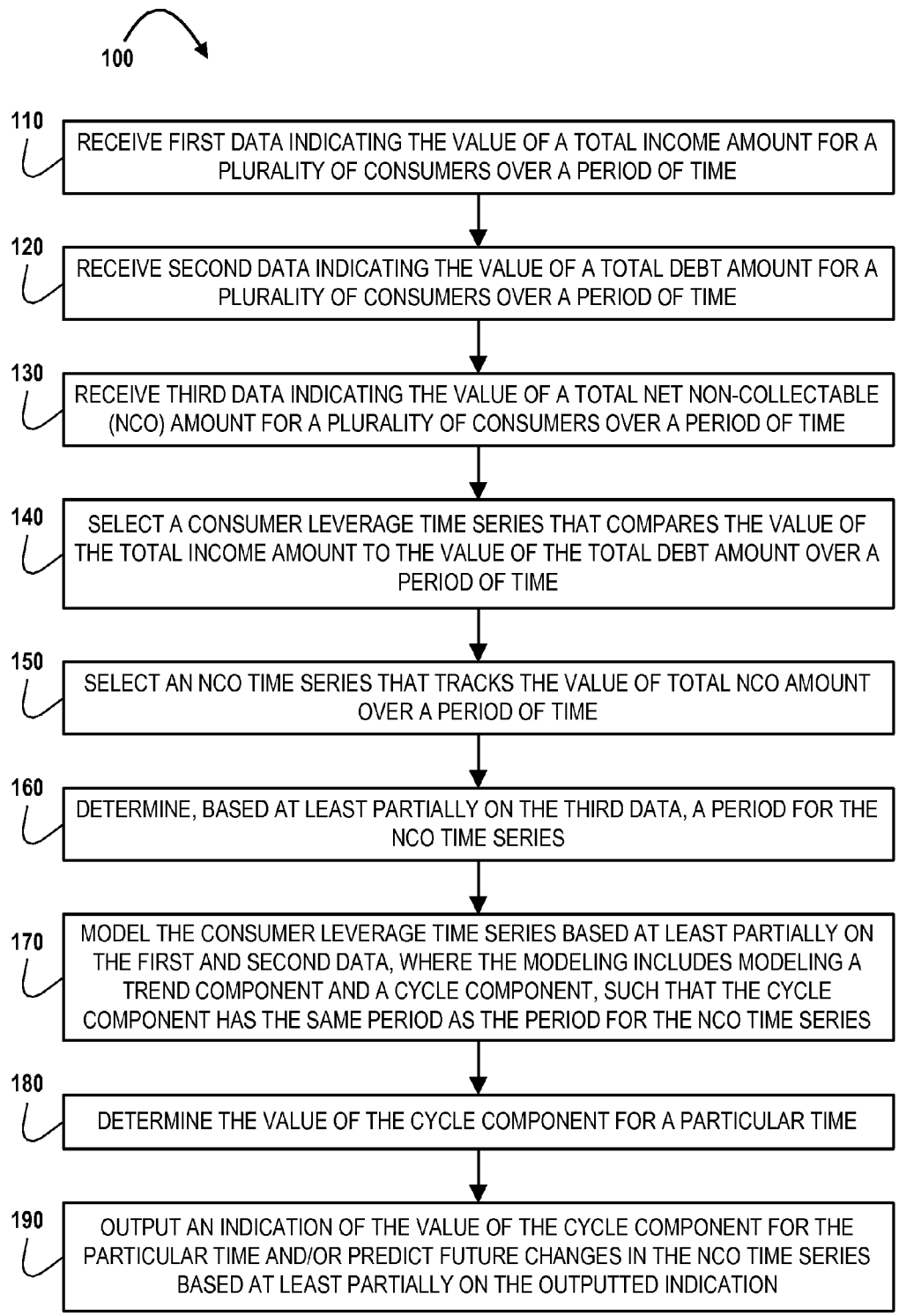
Figure 2:
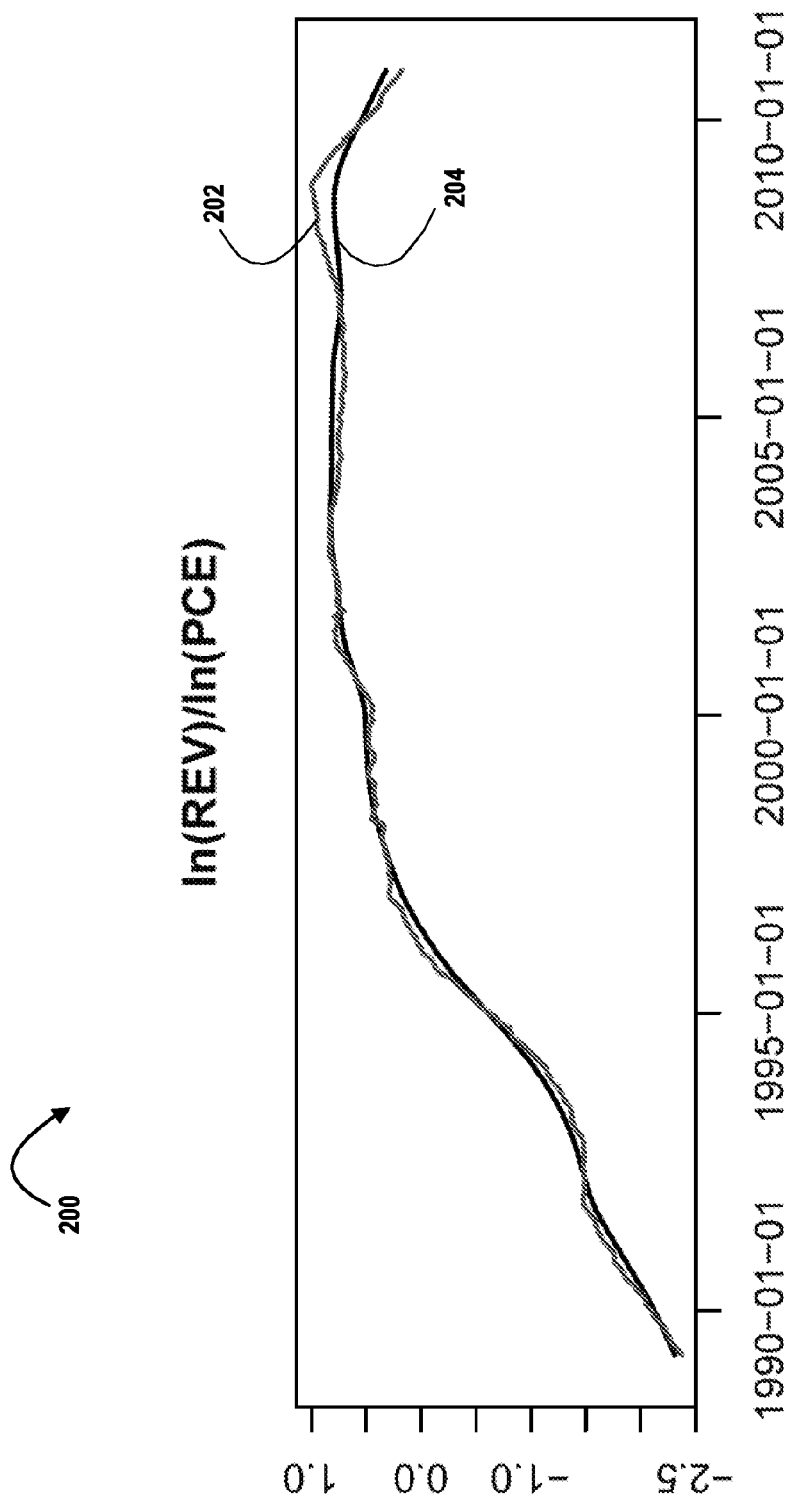
Figure 3:
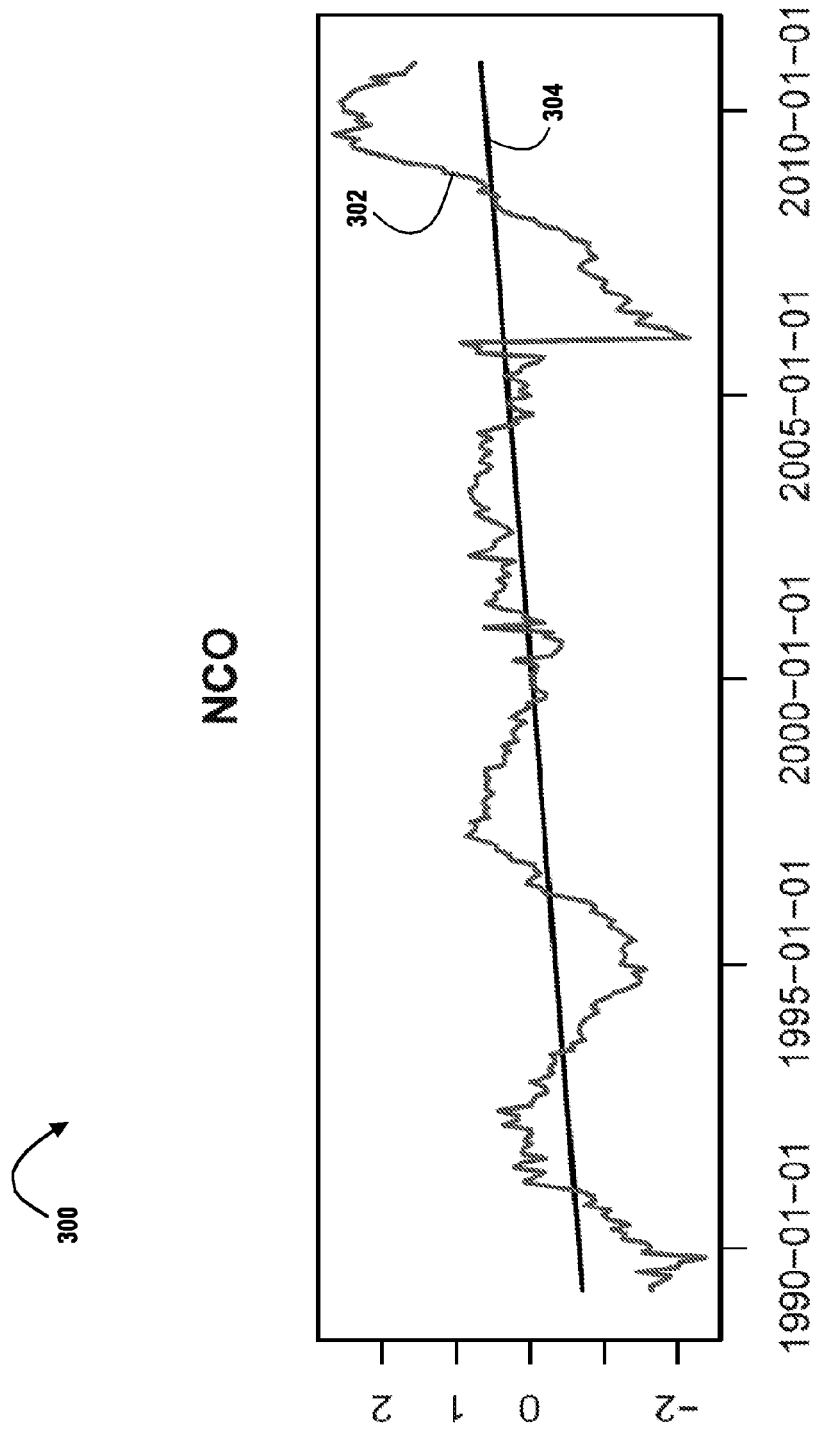
Figure 4:
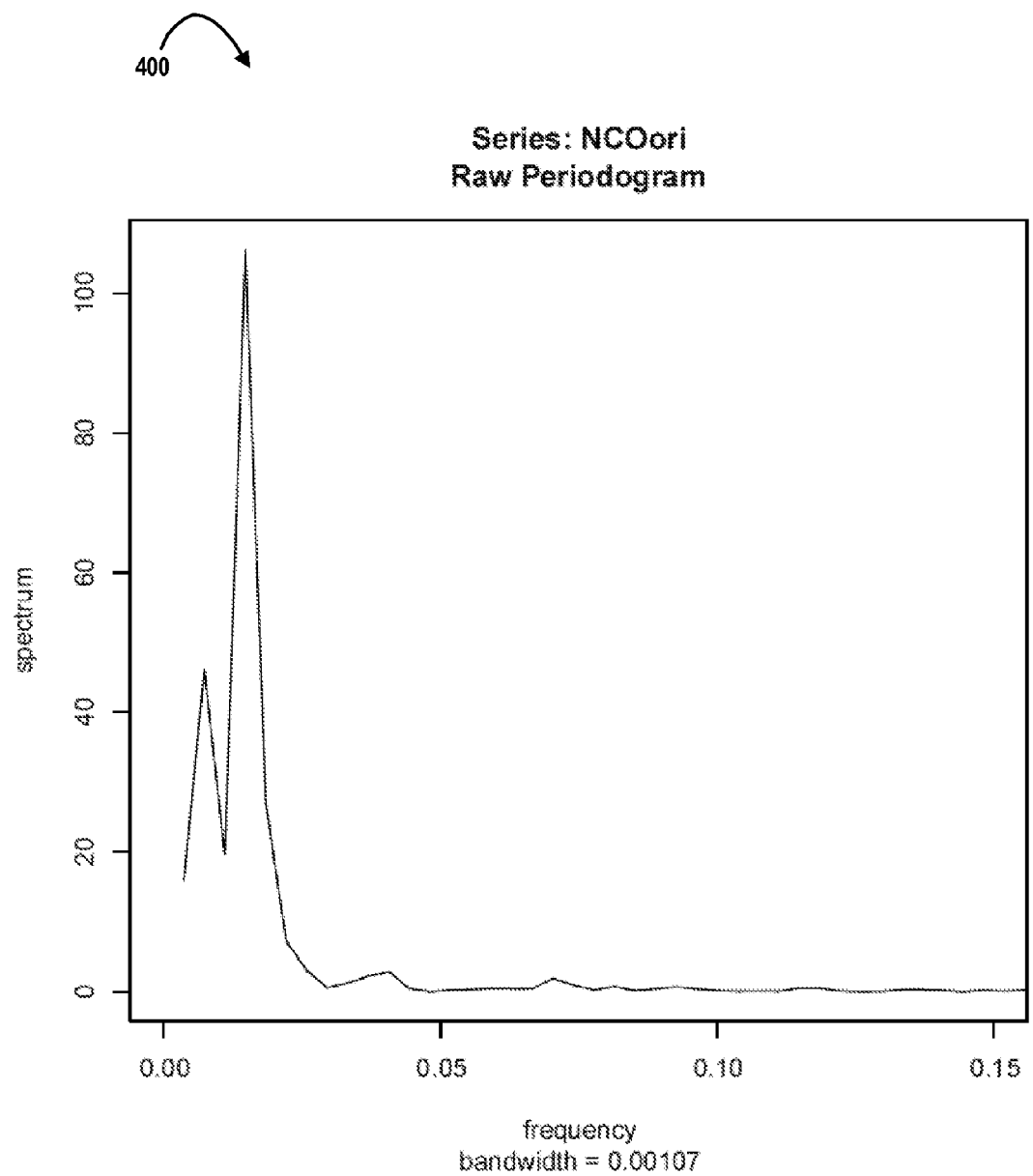
Figure 5:
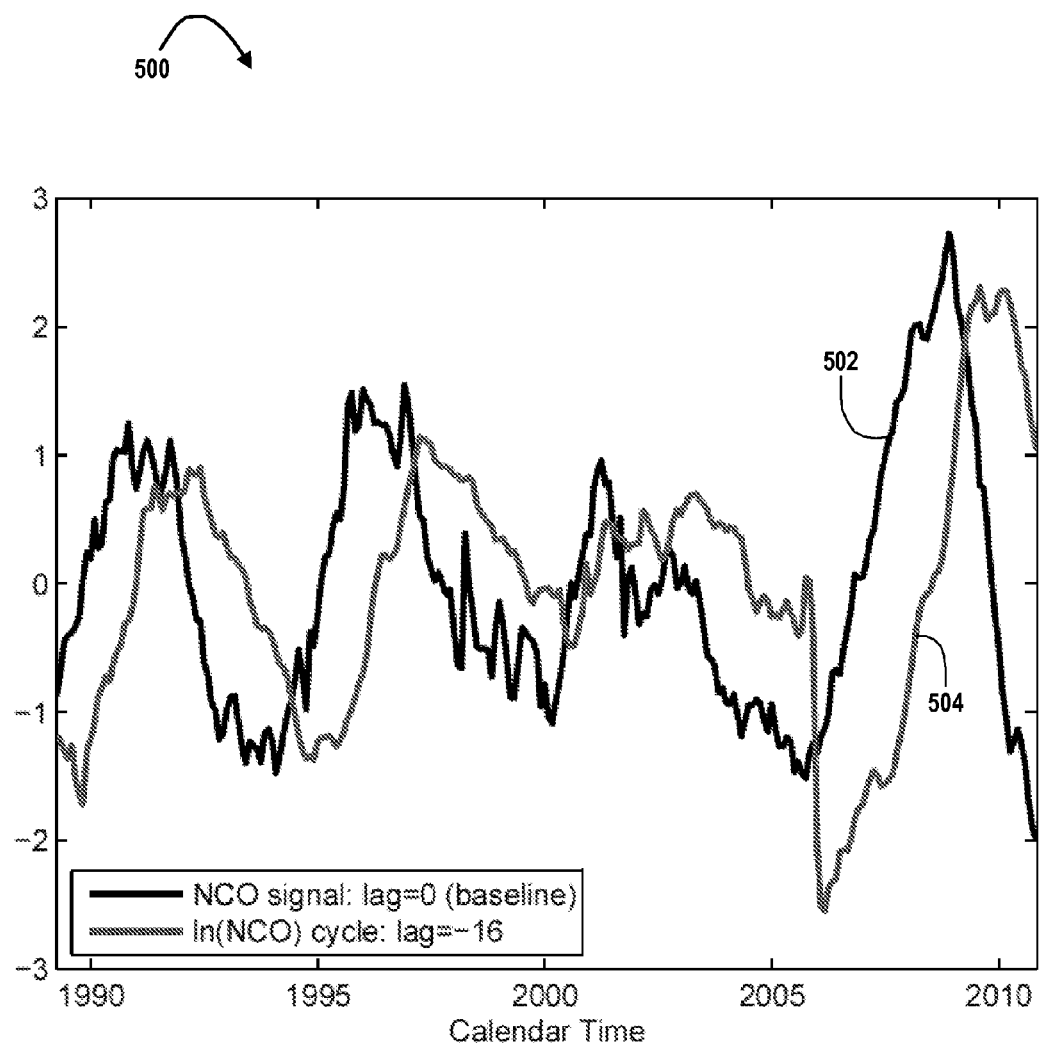
Figure 6:
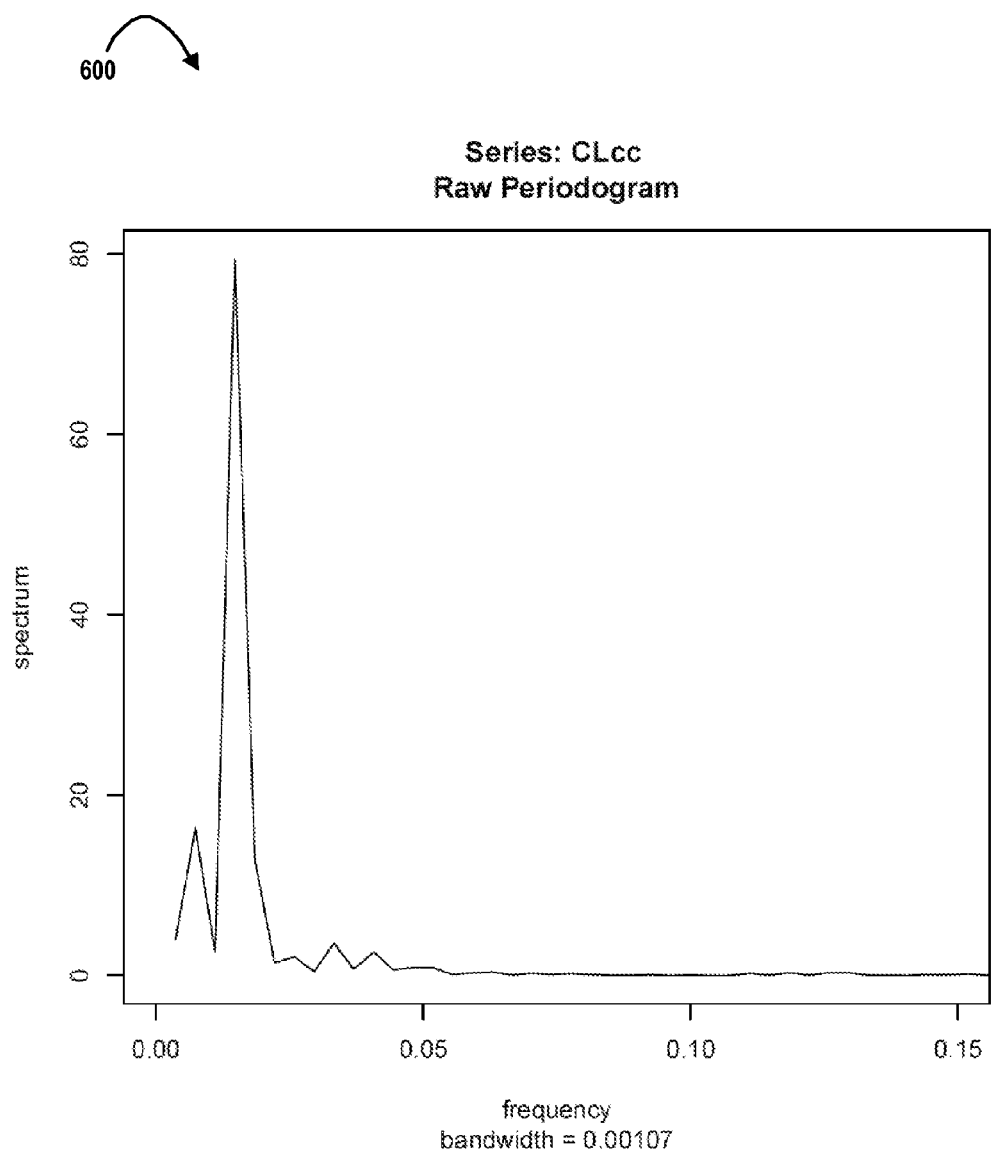
Figure 7:
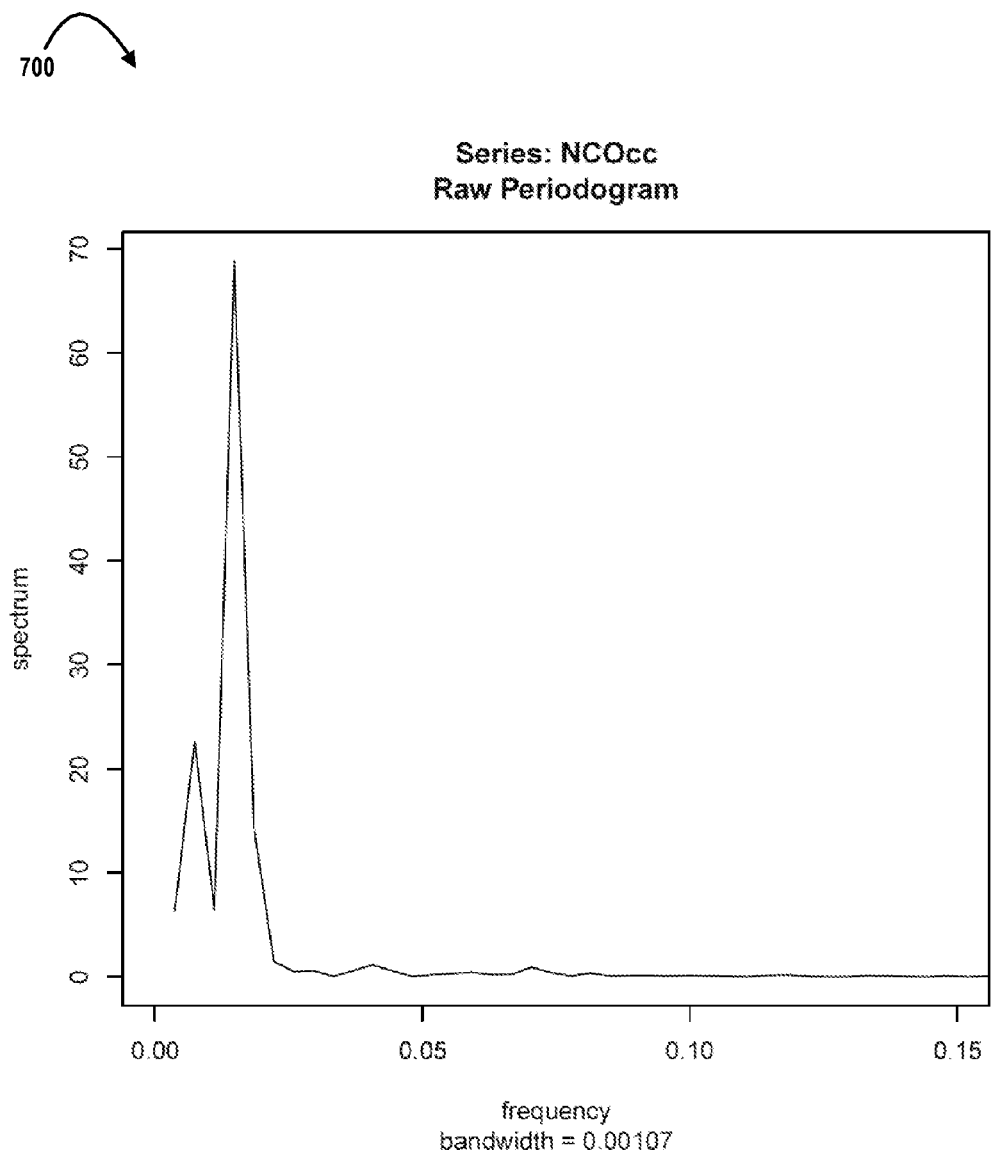
Figure 8:
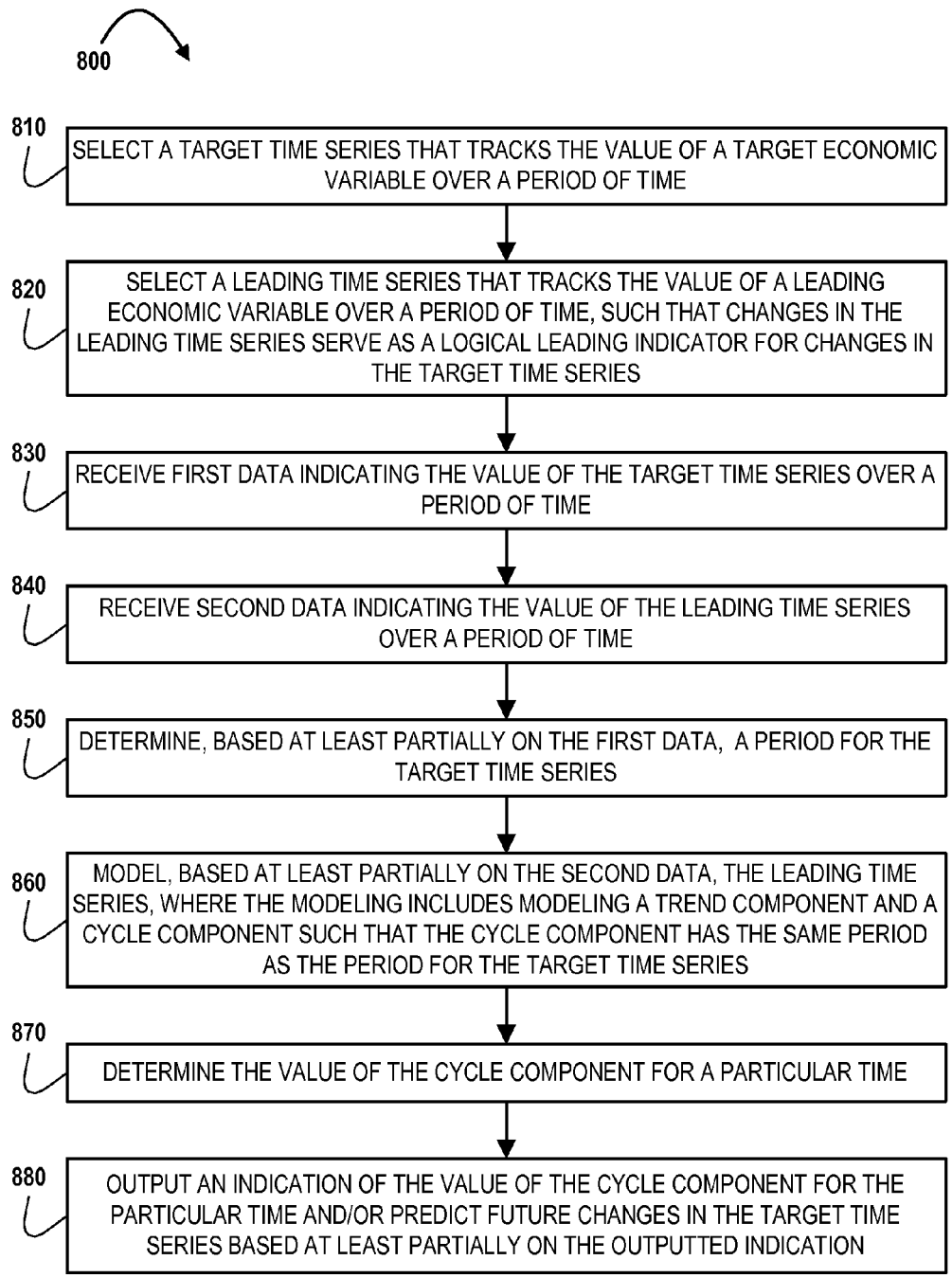
Figure 9:
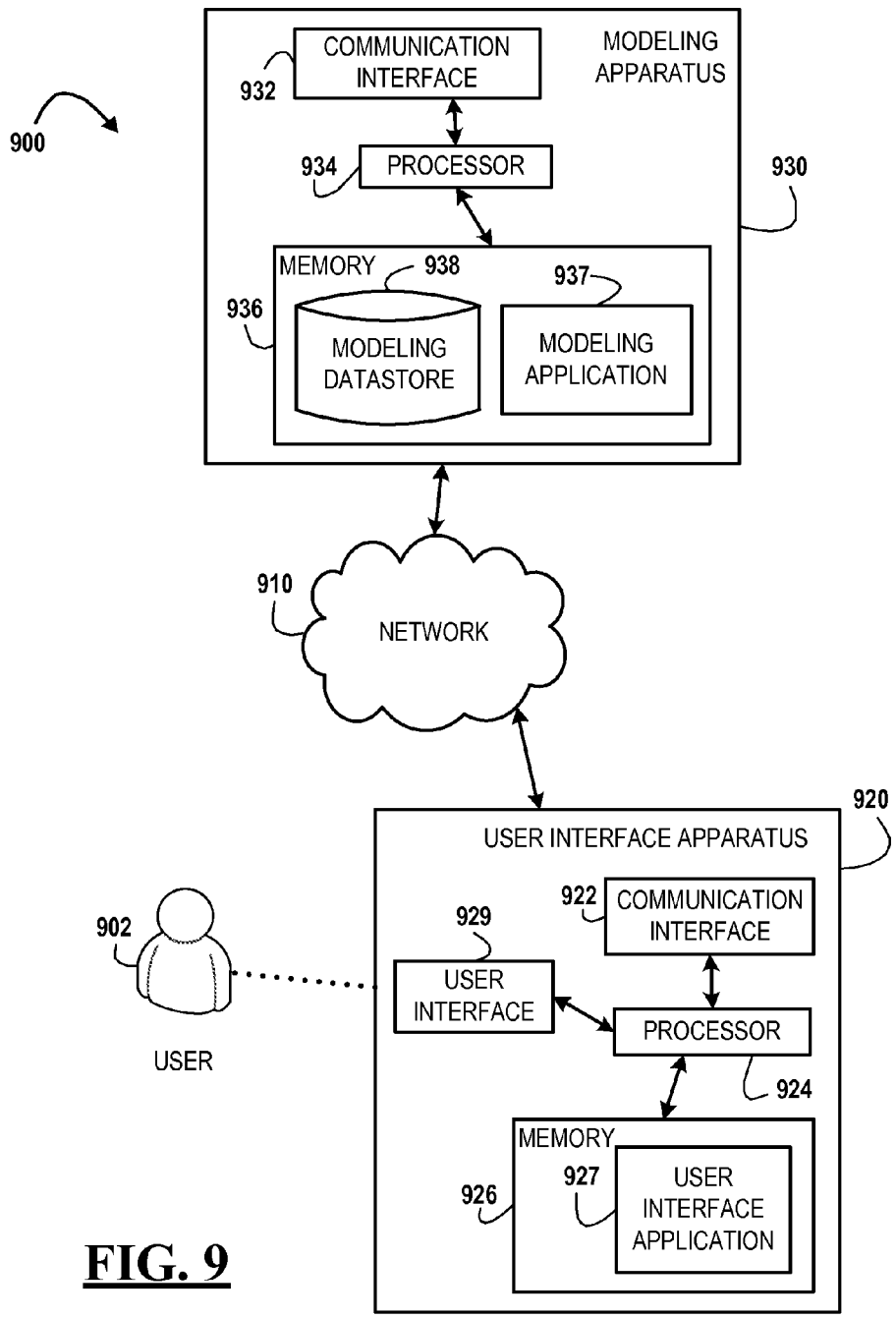

Having thus described some embodiments of the present invention in general terms, reference will now be made to the accompanying drawings, where:

FIG. 1 is a flow diagram illustrating a general process flow for determining a leading indictor for an NCO time series, in accordance with an embodiment of the present invention;

FIG. 2 is a chart illustrating a consumer leverage time series, where consumer leverage is defined as ln(REV)/ln (PCE), in accordance with an embodiment of the present invention;

FIG. 3 is a chart illustrating an NCO time series, in accordance with an embodiment of the present invention;

FIG. 4 is a periodogram of the power distribution among the frequencies of an NCO time series, in accordance with an embodiment of the present invention;

FIG. 5 is a chart illustrating scaled cycle components of a consumer leverage time series and of an NCO time series, in accordance with an embodiment of the present invention;

FIG. 6 is a periodogram of the power distribution among the frequencies of a cycle component of a consumer leverage time series, in accordance with an embodiment of the present invention;

FIG. 7 is a periodogram of the power distribution among the frequencies of a cycle component of an NCO time series, in accordance with an embodiment of the present invention;

FIG. 8 is a flow diagram illustrating a general process flow for determining a leading indicator for a target time series, in accordance with an embodiment of the present invention; and FIG. 9 is a block diagram illustrating technical components of a system for determining leading indicators and/or modeling one or more time series, in accordance with an embodiment of the present invention.

DETAILED DESCRIPTION OF EMBODIMENTS OF THE PRESENT INVENTION

In general terms, embodiments of the present invention relate to methods and apparatuses for determining one or more leading indicators and/or modeling one or more time series. In some embodiments, the leading indicator(s) can be used to predict changes in the time series of one or more economic variables. For example, in some embodiments, a leading indicator is used to predict changes in NCOs of revolving and/or installment credit debt. In other embodiments, a leading indicator is used to predict changes in commodity, bond, and/or stock prices. Indeed, embodiments of the present invention can be used to determine one or more leading indicators for many different types of economic variables. For simplicity, this disclosure will first discuss embodiments of the present invention directed to determining a leading indicator for NCOs before discussing other, more-generalized applications.

Leading Indicator for Net Non-Collectables

Failures to repay on credit accounts often occur when consumers borrow more than they can afford (i.e., when consumers become over-leveraged). Accordingly, it is assumed, in some embodiments of the present invention, that changes in consumer leverage, defined as the ratio of debt to income, can serve as a logical leading indicator to net non-collectibles of debt. During periods of time when debt grows slower than income, consumers have adequate financial capability to pay for debts incurred. However, when the reverse is true, income levels are not sufficient to pay for debts incurred and net non-collectibles typically increase. Following this reasoning, some embodiments of the present invention use information inherent in the time series for consumer leverage to determine an indicator that can predict changes in the time series for NCOs.

Referring now to FIG. 1, a general process flow 100 is provided for determining a leading indicator for an NCO time series, in accordance with an embodiment of the present invention. In general terms, the process flow 100 includes receiving first data indicating the value of a total income amount for a plurality of consumers over a period of time, as represented by block 110, receiving second data indicating the value of a total debt amount for a plurality of consumers over a period of time, as represented by block 120, and receiving third data indicating the value of a total NCO amount for a plurality of consumers over a period of time, as represented by block 130. The process flow 100 further includes selecting a consumer leverage time series that compares the value of the total income amount to the value of the total debt amount over a period of time, as represented by block 140. The method further includes selecting an NCO time series that tracks the value of the total NCO amount over a period of time, as represented by block 150.

As represented by block 160, the process flow 100 also includes determining, based at least partially on the third data, a period for the NCO time series. Then, as represented by block 170, the process flow 100 includes modeling the consumer leverage time series based at least partially on the first and second data. In some embodiments, this modeling includes: (i) modeling a trend component of the consumer leverage time series; and (ii) modeling a cycle component of the consumer leverage time series, such that the cycle component has the same period as the period determined for the NCO time series. In addition, the process flow 100 may include determining the value of the cycle component of the consumer leverage time series for a particular time, as represented by block 180, and/or outputting an indication of that value, as represented by block 190. In some embodiments, the method additionally or alternatively includes predicting future changes in the NCO time series based at least partially on the outputted indication. For example, in some embodiments, if the value of the cycle component is positive for the particular time, the method may provide a predictive indication that consumer net non-collectibles will increase beyond the particular time, but if the value of the cycle component is negative for the particular time, the method may provide a predictive indication that consumer net non-collectibles will decrease beyond that particular time.

Regarding block 110, the plurality of consumers may be any group of two or more consumers. For example, in some embodiments, the plurality of consumers represents all of the consumers within a country (e.g., United States) for which data is available. However, in other embodiments, the plurality of consumers may be defined in some other way, such as by some other predetermined geographic area (e.g., state, city, etc.) and/or income level. Further, it will be understood that the plurality of consumers referred to in block 110 may be the same group of consumers referred to in block 120 and/or block 130, and/or vice versa. However, in other embodiments, the plurality of consumers referred to in block 100 is not necessary the same group of consumers referred to in block 120. Likewise, the period of time referred to in block 110 may or may not be the same period of time referred to in blocks 120 and/or 130.

Also regarding block 110, the total income amount may be measured in any way. For example, in some embodiments, the total income amount may be defined as the total adjusted gross income reported by the plurality of consumers to the Internal Revenue Service (IRS). However, in other embodiments, the total income amount may be embodied as a proxy for total income. For example, the total income amount may be defined as personal spending because, in some countries (e.g., the United States), income can be difficult to determine and/or consumption may closely track income. However, in other embodiments, other proxies for income may be used. For example, for countries where consumption does not closely track income, such as Canada, GDP may be used as a proxy for income. For simplicity and without loss of generality, embodiments that use personal spending as a proxy for income are mostly discussed below.

In some embodiments, personal spending is defined as the total amount spent on goods and services by the plurality of consumers. Additionally or alternatively, in some embodiments, personal spending is embodied as the Personal Consumption Expenditures (PCE) data that is released monthly by the Bureau of Economic Analysis as a seasonally adjusted annualized rate. Previous releases of PCE are sometimes revised as source data becomes available. In some embodiments, the PCE is downloaded monthly from Moody's DataBuffet via a Microsoft Excel spreadsheet add-in.

Regarding block 120, the total debt amount may be measured in any way. For example, in some embodiments, the total debt amount is embodied as the total amount of unsecured, revolving balances released by the Federal Reserve Bank of the United States in seasonally adjusted dollars. This amount is sometimes referred to as Revolving Credit Outstanding (REV). REV is one of the most widely used measures of nonmortgage consumer credit and one of the best publicly available measures of the broad credit card market. REV indicates the rate at which the industry is expanding or contracting. Like PCE, the previous releases for REV are often revised as more data becomes available. In some embodiments, REV is downloaded monthly from Moody's DataBuffet via an Excel spreadsheet add-in. It will be understood that REV may also serve as a proxy for other types of debt and/or credit accounts because many consumers who have a credit card also have other forms of credit accounts, such as mortgages and/or automobile loans. Thus, it will be understood that a leading indicator for credit card NCOs can also be useful for predicting future failures to repay of other types of credit accounts.

Regarding block 130, the total NCO amount may be measured in any way. For example, in some embodiments, the total NCO amount is embodied as the monthly industry credit card account balances written off as uncollectable as an annualized percentage of total outstanding principal balance. In some embodiments, the NCO data is downloaded monthly from the Moody's website. Regarding block 140, the consumer leverage time series may be selected in any way. For example, in some embodiments, the consumer leverage time series represents the ratio of the total debt amount to the total income amount referred to in blocks 110 and 120. Specifically, in some embodiments, the consumer leverage time series is defined as the time series for ln(REV)/ln(PCE).

Regarding blocks 160 and 170, some embodiments of the present invention are configured to model the consumer leverage time series (and/or the NCO time series) by using a multivariate dynamic linear model (sometimes referred to herein as "the DLM model" for simplicity). In some embodiments, the DLM model uses income, debt, and NCOs (e.g., the period determined for the NCO time series) as inputs. Once constructed, the DLM model can be used to examine consumer leverage, describe the consumer credit cycle, and/or predict future changes in NCOs (and therefore help financial institutions minimize future credit losses).

In some embodiments, the DLM model is constructed based on several assumptions. First, it is assumed that consumer leverage (i.e., the ratio of debt to income) and NCOs are each composed of a trend component, representing long-term dynamics, and a cyclical component, representing short- and/or mid-term dynamics. This assumption is based on historical observation. Referring now to FIG. 2, a chart 200 that illustrates a consumer leverage time series is presented, where consumer leverage is defined as ln(REV)/ln(PCE). Curve 202 represents a scaled version of actual consumer leverage from 1990 to 2010, and curve 204 represents the trend component of consumer leverage over this period of time. (The trend component of the consumer leverage time series in FIG. 2 may be estimated, calculated using a regression analysis, and/or determined using one or more of the methods described below.) As shown in the chart 200, credit card usage increased rapidly relative to the growth of income throughout the 1990s. As lenders expanded their risk appetite and credit became more available, credit card debt increased.

As a result, consumer leverage increased until the industry matured, when consumer leverage growth slowed and then eventually declined.

Similar to consumer leverage, NCOs also had a relatively upward trend between 1990 and 2010, albeit at a different pace. Referring now to FIG. 3, a chart 300 that illustrates an NCO time series over that period of time is presented. Curve 302 represents a scaled version of actual NCOs from 1990 to 2010, and curve 304 represents the trend of the NCOs over this period of time. As shown in FIGS. 2 and 3, the consumer leverage time series and the NCO time series both fluctuate cyclically about their general trends. In other words, over this period of time, it can be assumed that consumers fluctuated between being over-leveraged and under-leveraged. This is presumably in response to natural expansions and contractions in the availability of credit, otherwise known as the consumer credit cycle.

Thus, in some embodiments, it is assumed that the consumer leverage time series and the NCO time series each have a "common" cyclical component that is driven by the underlying consumer credit cycle. As a result, in some embodiments, it is assumed that the cyclical component of the consumer leverage time series has the same period (and therefore frequency) as the period for the cyclical component of the NCO time series. Accordingly, it is assumed that the cyclical component of each time series has the same general shape, even though the amplitudes of the peaks and valleys of those cycles may not be the same. Further, in some embodiments, it is assumed that the cyclical component of the consumer leverage time series is coincident with the consumer credit cycle, and that the cyclical component of the NCO time series is lagging behind the consumer credit cycle (and therefore lagging behind the cyclical component of the consumer leverage time series). As described in more detail below, the actual amount of lag between the consumer leverage cycle and the NCO cycle is estimated within the model.

Further regarding the DLM model, it is assumed that the trend component of the consumer leverage time series represents the "equilibrium" of consumer leverage. In other words, the value of the trend component represents the expected amount of consumer debt for a given level of consumer income. Any deviation from this equilibrium value can indicate whether consumers are under-leveraged or over-leveraged. For example, if the value of the cyclical component of the consumer leverage time series is positive at a particular time, then the value of the consumer leverage time series at that particular time will be greater than the value of the trend component of the consumer leverage time series at that particular time. In such a case, the actual value of consumer leverage exceeds the "equilibrium" value of consumer leverage, meaning that consumers are generally over-leveraged. Conversely, if the value of the cyclical component of the consumer leverage time series is negative at a particular time, then the value of the consumer leverage time series at that particular time will be less than the value of the trend component of the consumer leverage time series at that particular time. In such a case, the actual value of consumer leverage is less than the "equilibrium" value of consumer leverage, meaning that consumers are generally under-leveraged. These assumptions are supported by the data shown in FIG. 2. As such, the cyclical component of the consumer leverage time series can provide an indication as to whether consumers are currently over- or under-leveraged, and therefore provide a leading indication as to whether NCOs will rise or fall in the future. For simplicity, it will be understood that the cyclical component of the consumer leverage time series is sometimes referred to herein as "the NCO signal."

In some embodiments, one or more (or all) of the assumptions discussed above are incorporated into a DLM model by decomposing the consumer leverage time series and the NCO time series into three unobserved components: a non-stationary trend that is unique to each series, a stationary cyclical component which is common (i.e., similar in period and/or frequency) between the time series, and an idiosyncratic component for each series. More specifically, if a panel of N economic time series (e.g., including the consumer leverage time series and the NCO time series) are collected into an N×1 vector $y_t$ and n data points are observed over time (i.e., t=1, n), then the i-th element of the observation vector at time t is denoted by $y_{it}$, where $$y_{it} = \mu_{it} + \delta_i \Psi_t + \epsilon_{it} \quad (1)$$

and where, i=1, ..., N. The first component in this DLM model, $\mu_{it}$, represents the individual trend component for the i-th time series, and the cycle component (common to all time series) is denoted by $\Psi_t$. For each time series, the contribution of the cycle component is measured by the coefficient $\delta_i$ for i=1, ..., N. Here, the idiosyncratic disturbance $\epsilon_{it}$ is assumed normal and independent from $\epsilon_{js}$ for i≠j and/or t≠s. The variance of the irregular disturbance varies for the different individual time series, meaning that $$\epsilon_{it} \sim NID(0, \sigma_{i,\epsilon}^2) \quad (2)$$

where $NID(0, \sigma_{i,\epsilon}^2)$ denotes normally and independently distributed with mean 0 and variance $\sigma_{i,\epsilon}^2$ for each time series i.

In some embodiments, the DLM model can be generalized by introducing shifts. In some of these embodiments, the DLM model becomes $$y_{it} = \mu_{it} + \delta_i \{\cos(\xi_i \lambda) \Psi_t^{(k)} + \sin(\xi_i \lambda) \Psi_t^{+(k)}\} + \epsilon_{it} \quad (3)$$

where i=1, ..., N and t=1, ..., n. Each individual trend component for the i-th time series, $\mu_{it}$, is specified as a local linear trend component, meaning that $$\mu_{i,t+1} = \mu_{i,t} + \beta_{i,t} + \eta_{i,t}, \quad \eta_{i,t} \sim NID(0, \sigma_{i,\eta}^2) \quad (4)$$

$$\beta_{i,t+1} = \beta_{i,t} + \zeta_{i,t}, \quad \zeta_{i,t} \sim NID(0, \sigma_{i,\zeta}^2) \quad (5)$$

for i=1, ..., N. The disturbances $\eta_{i,t}$ and $\zeta_{i,t}$ are serially and mutually independent from each other, and from other disturbances at all time points and across N equations. The trends are therefore independent of each other within the panel. In some embodiments, where desired, a smooth trend specification can be obtained by setting $\sigma_{i,\eta} = 0$, so that the trend component of each time series reduces to an integrated random walk process. In other words, in some embodiments, the trend component of the consumer leverage time series and/or the NCO time series can be determined using an integrated random walk method.

It will be understood that the model of basic trend plus cycle decomposition for time series i can be generalized such that the model becomes the basis for extracting trends and cycles. The m-th order stochastic trend component for time series i can be considered as given by $\mu_{it} = P_{it}^{(m)}$, where $$\Delta^m \mu_{i,t+1}^{(m)} = \zeta_{it}, \quad \zeta_{it} \sim NID(0, \sigma_{i,\eta}^2) \quad (6)$$

or $$\mu_{i,t+1}^{(j)} = \mu_{it}^j + \mu_{it}^{(j-1)}, j=m, m-1, \ldots, 1 \quad (7)$$

with $\mu_{it}^0 = \zeta_{it}$ as given by the previous equation for i=1, ..., N and t=1, ..., n.

In some embodiments, the cycle component (common to all time series) is denoted by $\Psi_t^{(k)}$. For each time series, the contribution of the cycle component is measured by the coefficient $\delta_i$ for i=1, ..., N. By using a standard trigonometric identity, it can be shown that a cycle is shifted $\xi_i$ time periods to the right (when $\xi_i>0$) or to the left (when $\xi_i<0$) by calculating $$\cos(\xi_i\lambda)\Psi_t^{(k)}+\sin(\xi_i\lambda)\Psi_t^{+(k)}$$

where $$-\frac{1}{2}\pi < \xi_i\lambda < \frac{1}{2}\pi.$$

The shift is with respect to t and the restrictive parameter space for $\xi_i$ follows from the periodic nature of trigonometric functions. In some embodiments, the fixed period of the phase in the trigonometric functions is chosen as the period with the highest power of the target time series (in this case, the NCO time series) using a spectral estimation method. In some embodiments, using a spectral estimation method helps guarantee the stability of the results and captures the typical cycle period T in the target time series. (It will be understood that, in some embodiments, $$\lambda = \frac{2\pi}{T}\bigg).$$

In some embodiments, the generalized specification for the k-th order cycle component is given by $\Psi_{t+1}^{(k)}$ (and its associated variable $\Psi_{t+1}^{+(k)}$), where $$\begin{pmatrix} \psi_{t+1}^{(j)} \\ \psi_{t+1}^{+(j)} \end{pmatrix} = \phi \begin{bmatrix} \cos(\lambda) & \sin(\lambda) \\ -\sin(\lambda) & \cos(\lambda) \end{bmatrix} \begin{pmatrix} \psi_t^{(j)} \\ \psi_t^{+(j)} \end{pmatrix} + \begin{pmatrix} \psi_t^{(j-1)} \\ \psi_t^{+(j-1)} \end{pmatrix} \quad (8)$$

where j=1, ..., k, and with $$\Psi_t^0 = \kappa_t \sim WN(0,\sigma_\kappa^2), \Psi_t^{+0} = \kappa_t^+ \sim WN(0,\sigma_\kappa^2)$$

for t=1, ... n. In some embodiments, the damping factor, $\Phi$, should fulfill $0<\Phi\leq 1$ so that the cycle component is stationary. Also, it will be understood that WN denotes white noise, which can, in some embodiments, be regarded as a sequence of independent and identically distributed (iid) random variables with mean 0 and variance $\sigma_\kappa^2$. In addition, $\Psi_{t+1}^{(k)}$ may be named as the state space wave function of the cycle component and $\Psi_{t+1}^{(k)}$ as the associated state space wave function of the cycle component. In some embodiments, both are needed to construct the cycle component using the sine and cosine functions.

Finally, in some embodiments, the DLM model involves latent processes $\{\mu_{i,t}, \beta_{i,t}, \Psi_{t+1}^{(j)}, \Psi_{t+1}^{+(j)}\}$, where i=1, ..., N and j=1, ..., k. In some embodiments, the hyperparameter set for the DLM model defined as $\{\Phi, \sigma_\kappa, \delta_i, \xi_i, \sigma_{\zeta i}, \sigma_{\epsilon i}\}$. To avoid identification problems, in some embodiments, $\delta_1=1$ and $\xi_1=0$, which means that the first time series (i.e., consumer leverage) will be treated as a baseline time series. In some embodiments, the latent processes are trained by applying dynamic linear modeling, and the hyperparameters are obtained by using a Maximum Likelihood Estimation (MLE) method.

It will be understood that the choice of initial values for the hyperparameters can be very important for a good final result. In some embodiments, for each single time series, a DLM model is constructed using an integrated random walk method and a periodic DLM component with Fourier representation, such that $$y_{it}=\mu_{it}+\Psi_t+\epsilon_{it}, \epsilon_{it}\sim NID(0,\sigma_{i,\epsilon}^2) \quad (9)$$

where i=1, ..., N and t=1, ..., n, and where $$\mu_{i,t+1}=\mu_{i,t}+\beta_{i,t}+\eta_{i,t}, \eta_{i,t}\sim NID(0,\sigma_{i,\eta}^2) \quad (10)$$

$$\beta_{i,t+1}=\beta_{i,t}+\zeta_{i,t}, \zeta_{i,t}\sim NID(0,\sigma_{i,\zeta}^2) \quad (11)$$

and $$\begin{pmatrix} \psi_{i,t+1} \\ \psi_{i,t+1}^+ \end{pmatrix} = \begin{bmatrix} \cos(\lambda) & \sin(\lambda) \\ -\sin(\lambda) & \cos(\lambda) \end{bmatrix} \begin{pmatrix} \psi_{i,t} \\ \psi_{i,t}^+ \end{pmatrix} + \begin{pmatrix} \kappa_{i,t} \\ \kappa_{i,t}^+ \end{pmatrix}, \begin{matrix} \kappa_{i,t} \sim WN(0,\sigma_{i,\kappa}^2) \\ \kappa_{i,t}^+ \sim WN(0,\sigma_{i,\kappa}^2) \end{matrix} \quad (12)$$

In some embodiments, there are three hyperparameters, $\sigma_{i,\kappa}, \sigma_{i,\zeta}$, and $\sigma_{i,\epsilon}$, for each time series. In some embodiments, with respective initial values of (0, 0, 0), the three hyperparameters are estimated using an MLE method. In some embodiments, the MLE estimates of $\sigma_{i,\zeta}$ and $\sigma_{i,\epsilon}$ and the average of MLE estimates for $\sigma_{i,\kappa}$ for a single time series model are used as the initial values for $\sigma_\kappa, \sigma_{i,\zeta}$, and $\sigma_{i,\epsilon}$ for the multivariate time series model. For the cycles obtained from single time series, the maximum cross correlation can be calculated between each single time series and the baseline time series, and the corresponding lag can be treated as the initial value of $\xi_i$. In some embodiments, the initial value of $\Phi$ is set to be 1.

Further, in some embodiments, the order of the cycle component of the i-th time series is set to k=1, and/or the order of the trend component of the i-th time series is set to m=2. In some embodiments, the order of the common cycle is set to k=1 because this order produces a cycle component shape that makes the most sense from a business perspective. In other words, the choice of k=1 produces a shape that most closely resembles the shape of the real consumer credit cycle, as it is thought to appear. The choice of k=1 is also advantageous because the DLM model only involves two time series (i.e., consumer leverage and NCOs). Additionally or alternatively, in some embodiments, the choice of k=1 enables the DLM model to retain as much information as possible without overly suffering from disturbances (i.e., because the shocks to a first-order cycle are periodic). In some embodiments, the order of the trend component of the i-th time series is set to m=2 for purposes of simplicity and/or because it is easier to treat the trend component as a local linear trend as opposed to something else.

As mentioned previously, the consumer leverage time series (e.g., ln(REV)/ln(PCE)) is considered the "baseline" or "leading" series and the NCO time series (e.g., ln(NCO)) is considered the "target" time series. As has been mentioned above, the fixed period of the phase in the trigonometric functions is chosen as the period with the highest power of the target time series by using a spectral estimation method. FIG. 4 shows a periodogram 400 of the power distribution among the frequencies of the target time series (i.e., the NCO time series). It will be understood that the periodogram 400 is based on the actual data for NCOs from 1990 to 2010. For that time period, the frequency with the highest power is found to have a period of approximately 68 months. It will be understood that the period is determined from the frequency of highest power by noting the equation T=1/f, where T is the period and f is the frequency. The frequency in this case is approximately 0.00107.

Referring now to FIG. 5, a chart 500 is provided that shows the scaled cycle components of the consumer leverage time series (e.g., ln(REV)/1n(PCE)) and the NCO time series (e.g., ln(NCO)). Curve 502 represents the scaled cycle component for the consumer leverage time series (i.e., the NCO signal) from 1990 to 2010, and curve 504 represents the scaled cycle component for the NCO time series from 1990 to 2010. As shown, the cycle component for the consumer leverage time series (i.e., the NCO signal) is leading the cycle component for the NCO time series by at least approximately 16 months. In other words, the current value of the NCO signal can be used to predict changes in the NCO time series 16 months in the future. In some embodiments, a financial institution can use this information to make credit decisions, i.e., extend credit when NCOs are predicted to decrease and/or restrict credit when NCOs are predicted to increase. In so doing, the NCO signal can help the financial institution minimize NCO losses and/or maximize credit profits.

Referring now to FIG. 6, a periodogram 600 of the power distribution among the frequencies of the cycle component of the consumer leverage time series (i.e., NCO signal) is shown. It will be understood that the periodogram 600 is based on the actual data for consumer leverage from 1990 to 2010. FIG. 7 shows a periodogram 700 of the power distribution among the frequencies of the cycle component of the NCO time series. It will be understood that the periodogram 700 is based on the actual data for NCOs from 1990 to 2010. During this time period, both time series have similar power distributions among their frequencies. In addition, each time series has a frequency with the highest power resulting in a period of approximately 68 months. This frequency is approximately 0.00107. It will be understood that the period of 68 months is approximately the same as the period for the original NCO time series shown in FIG. 4.

In some embodiments, as mentioned previously, the fixed period of the phase in the trigonometric functions is chosen as the period with the highest power of the NCO time series determined using a spectral estimation method. In some embodiments, this method is used because it is capable of accurately estimating the typical cycle period in the NCO time series. In some embodiments, the spectral estimation method is used so that the cycles as shown in the periodograms of FIG. 6 and FIG. 7 look similar to the one of the original NCO time series shown in FIG. 4. Indeed, in some embodiments, an accurate modeling of the cycle period of the NCO time series is needed because that period is the only input from the NCO time series being used to determine and/or model the cycle component of the consumer leverage time series.

In some embodiments, because the determination of the period for the NCO time series can be crucial to the construction of an accurate, reliable model, a tapering methodology is used in connection with the spectral estimation method. In this context, tapering means modifying the data shape of a time series to enhance the center of that time series relative to its extremities, so that the most important contents of the time series (i.e., the center) is emphasized in the analysis. Advantageously, in some embodiments, the use of the tapering methodology may prevent power amplitudes of non-existent periods from appearing in the spectral estimation analysis. Of course, the use of a tapering methodology may not be needed in every case. To determine whether a tapering methodology is needed, the highest-power periods can be iteratively extracted from the NCO time series (or any target time series) using zero to maximum tapering. If the resulting periods are all the same, then zero tapering can be used in the analysis. However, if the resulting periods are not all the same, then maximum tapering (or at least some tapering) can be used in the analysis to improve the determination of the period for the NCO time series.

It will be understood that the cycle component of the consumer leverage time series, when determined using one or more of the embodiments described herein, can be used to predict future changes in the NCO time series. Indeed, in some embodiments, the model of the cycle component of the consumer leverage time series can predict future changes up to the length of the cycle period (e.g., up to approximately 16 months when the model is constructed using the data described in connection with FIGS. 2-7). However, to predict changes in the NCO time series (or any target time series for that matter) beyond this period of time, a forecasting model is needed. In some embodiments, the forecasting model is constructed as an Auto Regressive (AR) model. In some of these embodiments, the AR model has order p, where p is chosen to be equal with the highest-power period of the leading indicator time series (e.g., the consumer leverage time series).

Generalized Applications

Of course, the methods described in connection with FIGS. 2-7 are directed to modeling a cycle component of a consumer leverage time series and then using that to predict future changes in an NCO time series. It will be understood that those methods can also be used to model the cycle component of a different "baseline" or "leading" time series and/or to predict future changes in a different "target" time series. For example, in some embodiments, the methods described in connection with FIGS. 2-7 can be used to predict future changes in the price of a commodity (i.e., the price of the commodity is the target time series). This more-generalized approach is discussed below in connection with FIG. 8.

Referring now to FIG. 8, a general process flow 800 is provided for determining a leading indicator for a target time series, in accordance with an embodiment of the present invention. In general terms, the process flow 800 includes selecting a target time series that tracks the value of a target economic variable over a period of time, as represented by block 810. The process flow 800 also includes, as represented by block 820, selecting a leading time series that tracks the value of a leading economic variable over a period of time, such that changes in the leading time series serve as a logical leading indicator for changes in the target time series. In addition, as represented by block 830, the method also includes receiving first data indicating the value of the target time series over a period of time, and as represented by block 840, receiving second data indicating the value of the leading time series over a period of time.

In addition, the process flow 800 also includes determining, based at least partially on the first data, a period for the target time series, as represented by block 850. Then, as represented by block 860, the process flow 800 includes modeling, based at least partially the second data, the leading time series, where the modeling includes: (i) modeling a trend component of the leading time series; and (ii) modeling a cycle component of the leading time series, such that the cycle component has the same period as the period for the target time series. Thereafter, as represented by block 870, the method includes determining the value of the cycle component for a particular time, and as represented by block 880, outputting an indication of the value of the cycle component for the particular time, and/or predicting future changes in the target time series based at least partially on the outputted indication.

In some embodiments, one or more portions of the process flow 800 are performed using one or more of the equations, methods, and/or techniques described in connection with FIGS. 2-7. For example, in some embodiments, the period for the target time series is determined using a spectral estimation method and/or tapering methodology. As another example, in some embodiments, the trend component of the leading time series is modeled by setting the order of the trend component to two. As still another example, in some embodiments, the cycle component of the target time series is modeled by setting the order of the cycle component to one.

Further, it will be understood that one or more apparatuses, computers, and/or processors may perform one or more portions of the process flow 800 (and/or the process flow 100). In some embodiments, these device(s) perform the one or more portions automatically and/or without user intervention. For example, in some embodiments, the target time series and/or the leading time series are automatically selected by a processor. As another example, in some embodiments, an apparatus is configured to automatically select a leading time series based at least partially on a selection (e.g., by a user, by another apparatus, etc.) of a target time series. For example, in some embodiments, if a user selects the national unemployment rate as the target time series, an apparatus may be configured to select national gross domestic product (GDP) as the leading time series. As another example, in some embodiments, if a user selects consumer leverage as the leading time series, an apparatus may be configured to select retail store profit as the target time series. In some embodiments, the apparatus may alternatively be configured to present a plurality of target time series (and/or leading time series) to the user for selection, such as, for example, retail store profits, NCOs, financial institution losses, and the like.

In some embodiments, an apparatus can be configured to perform any of the portions of the process flow 800 represented by blocks 810-880 (and/or the process flow 100 represented by blocks 110-190) upon or after one or more triggering events, which, in some embodiments, is one or more of the other portions of the process flow 800 (and/or process flow 100). As used herein, a "triggering event" refers to an event that automatically (i.e., without human intervention) triggers the execution, performance, and/or implementation of a triggered action, either immediately, nearly immediately, or sometime after (e.g., within minutes, etc.) the occurrence of the triggering event. For example, in some embodiments, the apparatus is configured such that the apparatus determining the period for the target time series (the triggering event) automatically and immediately or nearly immediately (e.g., within 3-30 seconds, etc.) triggers the apparatus to model the leading time series (the triggered action(s)).

In some embodiments, the apparatus having the process flow 800 (and/or the process flow 100) is configured to automatically perform one or more portions of the process flow 800 represented by blocks 810-880, whereas in other embodiments, one or more of the portions of the process flow 800 represented by blocks 810-880 (and/or portions of the process flow 100 represented by blocks 110-190) require and/or involve human intervention (e.g., a user operating the apparatus configured to perform the process flows 100 and/or 800).

Referring now to FIG. 9, a system 900 for determining leading indicators and/or modeling one or more time series is provided, in accordance with an embodiment of the present invention. As illustrated, the system 900 includes a network 910, a user interface apparatus 920, and a modeling apparatus 930. FIG. 9 also shows a user 902 who has access to the user interface apparatus 920. In accordance with some embodiments, the user interface apparatus 920 and the modeling apparatus 930 are each maintained by the same financial institution. For example, in some embodiments, the user 902 is an employee of the financial institution, the modeling apparatus 930 is embodied as a modeling server maintained by the financial institution, and the user interface apparatus 920 is embodied as a workstation computer maintained by the financial institution and accessible to the user 902. However, in other embodiments, the user interface apparatus 920 and the modeling apparatus 930 are maintained by separate entities.

As shown in FIG. 9, the user interface apparatus 920 and the modeling apparatus 930 are each operatively and selectively connected to the network 910, which may include one or more separate networks. The network 910 may include one or more telephone networks (e.g., cellular networks, CDMA networks, any wireline and/or wireless network over which communications to telephones and/or mobile phones are sent, etc.), local area networks (LANs), wide area networks (WANs), global area networks (GANs) (e.g., the Internet, etc.), and/or one or more other telecommunications networks. It will also be understood that the network 910 may be secure and/or unsecure and may also include wireless and/or wireline technology.

The user interface apparatus 920 may include and/or be embodied as any apparatus described and/or contemplated herein. For example, in some embodiments, the user interface apparatus 920 includes and/or is embodied as a computer (e.g., personal computer, workstation computer, tablet computer, laptop computer, etc.), mobile phone, gaming device, and/or the like. In some embodiments, the user interface apparatus 920 is configured to perform any one or more embodiments described and/or contemplated herein, such as, for example, performing one or more portions of the process flow 100 and/or the process flow 800. In addition, the user interface apparatus 920 may be configured to perform one or more financial and/or non-financial transactions, and/or access and/or navigate a network (e.g., the Internet).

As illustrated in FIG. 9, in accordance with some embodiments of the present invention, the user interface apparatus 920 includes a communication interface 922, a processor 924, a memory 926 having a user interface application 927 stored therein, and a user interface 929. In such embodiments, the processor 924 is operatively and selectively connected to the communication interface 922, the user interface 929, and the memory 926.

Each communication interface described herein, including the communication interface 922, generally includes hardware, and, in some instances, software, that enables a portion of the system 900, such as the user interface apparatus 920, to send, receive, and/or otherwise communicate information to and/or from the communication interface of one or more other portions of the system 900. For example, the communication interface 922 of the user interface apparatus 920 may include a modem, network interface controller (NIC), NFC interface, network adapter, network interface card, and/or some other electronic communication device that operatively connects the user interface apparatus 920 to another portion of the system 900, such as, for example, the modeling apparatus 930.

Each processor described herein, including the processor 924, generally includes circuitry for implementing the audio, visual, and/or logic functions of that portion of the system 900. For example, the processor may include a digital signal processor device, a microprocessor device, and various analog-to-digital converters, digital-to-analog converters, and other support circuits. Control and signal processing functions of the system in which the processor resides may be allocated between these devices according to their respective capabilities. The processor may also include functionality to operate one or more software programs based at least partially on computer-executable program code portions thereof, which may be stored, for example, in a memory device, such as in the user interface application 927 of the memory 926 of the user interface apparatus 920.

Each memory device described herein, including the memory 926 for storing the user interface application 927 and other information, may include any computer-readable medium. For example, the memory may include volatile memory, such as volatile random access memory (RAM) having a cache area for the temporary storage of data. Memory may also include non-volatile memory, which may be embedded and/or may be removable. The non-volatile memory may additionally or alternatively include an EEPROM, flash memory, and/or the like. The memory may store any one or more of portions of information used by the apparatus in which it resides to implement the functions of that apparatus.

As shown in FIG. 9, the memory 926 includes the user interface application 927. It will be understood that the user interface application 927 can be operable (e.g., usable, executable, etc.) to perform one or more portions of any embodiment described and/or contemplated herein, such as, for example, one or more portions of the process flows 100 and/or 800 described herein. For example, in some embodiments, the user interface application 927 is operable to receive data indicating the value of a total income amount, total debt amount, and/or a total NCO amount for a plurality of consumers over a period of time. As another example, in some embodiments, the user interface application 927 is operable to select (and/or enable the user 902 to select) one or more time series for examination and/or modeling, such as, for example, a consumer leverage time series and/or an NCO time series. Still further, in some embodiments, the user interface application 927 is operable to determine a period for a target time series (e.g., for an NCO time series) and/or set the period for a cycle component of a first time series (e.g., consumer leverage time series) as the period determined for the target time series.

As another example, in some embodiments, the user interface application 927 is additionally or alternatively operable to model (and/or enable the user 902 to model) one or more time series. In some of these embodiments, the user interface application 927 is operable to decompose (and/or enable the user 902 to decompose) a time series into a trend component and/or a cycle component. In some embodiments, the user interface application 927 is operable to determine the value of the cycle component of a particular time series for one or more particular times. Still further, in some embodiments, the user interface application 927 is operable to output an indication of the value of the cycle component at those one or more particular times. For example, in some embodiments, the user interface application 927 is operable to output an indication of the value of the cycle component for a particular time, where the indication includes the actual value of the cycle component for the particular time, whether the value is positive or negative, and/or what the value indicates about a target time series (e.g., the value indicates that consumer net non-collectibles will increase in the future).

It will also be understood that the user interface application 927 can be operable to select (and/or enable the user 902 to select) one or more economic variables to model as one or more time series. In some of these embodiments, the application 927 is operable to select a leading time series and a target time series, such that changes in the target time series lag behind changes in the leading time series, and/or such that changes in the leading time series serve as a logical leading indicator (e.g., as determined by one or more predetermined rules) for changes in the target time series.

In some embodiments, the user interface application 927 includes one or more computer-executable program code portions for causing and/or instructing the processor 924 to perform one or more of the functions of the user interface application 927, one or more of the functions of the user interface apparatus 920 described and/or contemplated herein, and/or one or more portions of any embodiment described and/or contemplated herein. In some embodiments, the user interface application 927 includes and/or uses one or more network and/or system communication protocols.

As shown in FIG. 9, the user interface apparatus 920 also includes the user interface 929. It will be understood that the user interface 929 (and any other user interface described and/or contemplated herein) can include and/or be embodied as one or more user interfaces. It will also be understood that, in some embodiments, the user interface 929 includes one or more user output devices for presenting information and/or one or more items to the user interface apparatus user (e.g., the user 902, etc.), such as, for example, one or more displays, speakers, receipt printers, dispensers, and/or the like. In some embodiments, the user interface 929 additionally or alternatively includes one or more user input devices, such as, for example, one or more buttons, keys, dials, levers, directional pads, joysticks, keyboards, keypads, mouses, accelerometers, controllers, microphones, touchpads, touchscreens, haptic interfaces, styluses, scanners, biometric readers, motion detectors, cameras, physical card readers, and/or the like for receiving information from one or more items and/or from the user interface apparatus user (e.g., the user 902).

FIG. 9 also illustrates a modeling apparatus 930, in accordance with an embodiment of the present invention. The modeling apparatus 930 may include any apparatus described and/or contemplated herein. In some embodiments, the modeling apparatus 930 includes and/or is embodied as one or more servers, engines, mainframes, personal computers, network devices, front end systems, back end systems, and/or the like. In some embodiments, the modeling apparatus 930 is configured to perform any one or more embodiments described and/or contemplated herein, such as, for example, performing one or more portions of the process flow 100 and/or the process flow 800. In addition, the modeling apparatus 930 may be configured to perform one or more financial and/or non-financial transactions, and/or access and/or navigate a network (e.g., the Internet).

In some embodiments, such as the one illustrated in FIG. 9, the modeling apparatus 930 includes a communication interface 932, a processor 934, and a memory 936, which includes an modeling application 937 and an modeling datastore 938 stored therein. As shown, the communication interface 932 is operatively and selectively connected to the processor 934, which is operatively and selectively connected to the memory 936.

The modeling application 937 can be operable (e.g., usable, executable, etc.) to perform one or more portions of any embodiment described and/or contemplated herein. For example, in some embodiments, the modeling application 937 is operable to perform one or more portions of the process flows 100 and/or 800 described herein. For example, in some embodiments, the modeling application 937 is operable to receive data indicating a total income amount, total debt amount, and/or a total NCO amount for a plurality of consumers. As another example, in some embodiments, the modeling application 937 is operable to select (and/or enable the user 902 to select) one or more time series for examination and/or modeling, such as, for example, a consumer leverage time series and/or an NCO time series. Still further, in some embodiments, the modeling application 937 is operable to determine a period for a target time series (e.g., for an NCO time series) and/or set the period for a cycle component of a first time series (e.g., consumer leverage time series) as the period determined for the target time series.

As another example, in some embodiments, the modeling application 937 is additionally or alternatively operable to model (and/or enable the user 902 to model) one or more time series. In some of these embodiments, the modeling application 937 is operable to decompose (and/or enable the user 902 to decompose) a time series into a trend component and/or a cycle component. In some embodiments, the modeling application 937 is operable to determine the value of the cycle component of a particular time series for one or more particular times. Still further, in some embodiments, the modeling application 937 is operable to output an indication of the value of the cycle component at those one or more particular times.

It will also be understood that the modeling application 937 can be operable to select (and/or enable the user 902 to select) one or more economic variables to model as one or more time series. In some of these embodiments, the application 937 is operable to select a first time series and a target time series, such that the changes in the target time series lag behind changes in the first time series, and such that changes in the first time series serve as a logical leading indicator (e.g., as determined by one or more predetermined rules) for changes in the target time series.

In some embodiments, the modeling application 937 includes one or more computer-executable program code portions for causing and/or instructing the processor 934 to perform one or more of the functions of the modeling application 937, one or more of the functions of the modeling apparatus 930 described and/or contemplated herein, and/or one or more portions of any embodiment described and/or contemplated herein. In some embodiments, the modeling application 937 includes and/or uses one or more network and/or system communication protocols. In some embodiments, the modeling application 937 is operable to enable the modeling apparatus 930 to communicate with one or more other portions of the system 900, such as, for example, the modeling datastore 938 and/or the user interface apparatus 920, and/or vice versa.

In addition to the modeling application 937, the memory 936 also includes the modeling datastore 938. The modeling datastore 938 can be configured to store any type and/or amount of information. For example, the modeling datastore 938 may include information associated with one or more users (e.g., the user 902), economic variables (e.g., REV data, PCE data, NCO data, etc.), previously-constructed models (e.g., for consumer leverage time series, for commodity time series, for NCO time series, etc.), spectral estimation methods, integrated random walk methods, periods and/or frequencies of one or more target time series, and/or the like.

Further, the modeling datastore 938 may include any one or more storage devices, including, but not limited to, datastores, databases, and/or any of the other storage devices typically associated with a computer system. It will also be understood that the modeling datastore 938 may store information in any known way, such as, for example, by using one or more computer codes and/or languages, alphanumeric character strings, data sets, figures, tables, charts, links, documents, and/or the like. Further, in some embodiments, the modeling datastore 938 includes information associated with one or more applications, such as, for example, the modeling application 937 and/or the user interface application 927.

In some embodiments, the modeling datastore 938 provides a real-time or near real-time representation of the information stored therein, so that, for example, when the processor 934 accesses the modeling datastore 938, the information stored therein is current or nearly current. Although not shown, in some embodiments, the user interface apparatus 920 includes a datastore that is configured to store any information associated with the user interface apparatus 920, the user interface application 927, and/or the like. It will be understood that this datastore can store information in any known way, can include information associated with anything shown in FIG. 9, and/or can be configured similar to the modeling datastore 938.

It will also be understood that the embodiment illustrated in FIG. 9 is exemplary and that other embodiments may vary. For example, in some embodiments, some or all of the portions of the system 900 are combined into a single portion. Specifically, in some embodiments, the user interface apparatus 920 and the modeling apparatus 930 are combined into a single user interface and modeling apparatus that is configured to perform all of the same functions of those separate portions as described and/or contemplated herein. Likewise, in some embodiments, some or all of the portions of the system 900 are separated into two or more distinct portions. In addition, the various portions of the system 900 may be maintained by the same or separate parties. Also, the system 900 and/or one or more portions of the system 900 may include and/or implement any embodiment of the present invention described and/or contemplated herein.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, microcode, etc.), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatuses and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s)

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A computer-implemented method comprising:
receiving first data indicating a value of a total income amount for an aggregate of a plurality of consumers over a period of time;
receiving second data indicating a value of a total debt amount for the aggregate of the plurality of consumers over a period of time;
receiving third data indicating a value of a target economic variable over a period of time;
selecting a consumer leverage time series that compares the value of the total income amount for the aggregate of the plurality of consumers to the value of the total debt amount for the aggregate of the plurality of consumers over a period of time;
selecting a second time series that tracks the value of the target economic variable over a period of time, wherein changes in the consumers leverage time series serve as a logical leading indicator for changes in the second time series;
modeling, using a computer processing device, based at least partially on the first and the second data, the consumer leverage time series, wherein the modeling comprises:
modeling a trend component of the consumer leverage time series; and
modeling a cycle component of the consumer leverage time series by:
determining, using a computer processing device, using a spectral estimation method and based at least partially on the third data, a period for the second time series; and
setting a period for the cycle component of the consumer leverage time series as the period determined for the second time series;
determining, using a computer processing device, a value of the cycle component for a particular time; and
outputting an indication of the value of the cycle component for the particular time.

2. The computer-implemented method of claim 1, wherein the outputting the indication comprises:
when the value of the cycle component is positive for the particular time, outputting a predictive indication that consumer net non-collectibles will increase beyond the particular time;
when the value of the cycle component is negative for the particular time, outputting a predictive indication that consumer net non-collectibles will decrease beyond the particular time.

3. The computer-implemented method of claim 1, wherein the modeling the trend component of the consumer leverage time series comprises:
modeling the trend component of the consumer leverage time series using an integrated random walk method.

4. The computer-implemented method of claim 1, wherein the modeling the trend component of the consumer leverage time series comprises setting an order of the trend component of the consumer leverage time series to two, and wherein the modeling a cycle component of the consumer leverage time comprises setting the order of the cycle component of the consumer leverage time series to one.

5. The computer-implemented method of claim 1, wherein the target economic variable is consumer net non-collectibles.

6. The computer-implemented method of claim 5, wherein the determining the period for the second time series comprises determining the period such that the period is approximately 68 months.

7. The computer-implemented method of claim 5, further comprising computer-executable instruction code, that when executed causes the processing device to:
model, based at least partially on the third data, a consumer net non-collectable (NCO) time series, wherein the modeling comprises:
modeling a trend component of the net non-collectable time series; and
modeling a cycle component of the net non-collectable time series, and
wherein the modeling the cycle component of the consumer leverage time series comprises modeling the cycle component of the consumer leverage time series such that the cycle component of the consumer leverage time series leads the cycle component of the net non-collectable time series by at least approximately 16 months.

8. The computer-implemented method of claim 1, wherein the total income amount for the aggregate of the plurality of consumers comprises an aggregated personal consumption expenditures of the plurality of consumers as a proxy for the total income amount.

9. The computer-implemented method of claim 1, wherein the total debt amount for the aggregate of the plurality of consumers comprises an aggregated revolving credit outstanding of the plurality of consumers.

10. An apparatus comprising:
a communication interface configured to:
receive first data indicating a value of a total income amount for an aggregate of a plurality of consumers over a period of time; and
receive second data indicating a value of a total debt amount for the aggregate of the plurality of consumers over a period of time;
receive third data indicating a value of a target economic variable over a period of time;
a processor operatively connected to the communication interface and configured to:
select a consumer leverage time series that compares the value of the total income amount for the aggregate of the plurality of consumers to the value of the total debt amount for the aggregate of the plurality of consumers over a period of time;
select a second time series that tracks the value of the target economic variable over a period of time, wherein changes in the consumers leverage time series serve as a logical leading indicator for changes in the second time series;
model, based at least partially on the first and the second data, the consumer leverage time series, wherein the processor models the consumer leverage time series by:
modeling a trend component of the consumer leverage time series; and
modeling a cycle component of the consumer leverage time series by:
determining, using a spectral estimation method and based at least partially on the third data, a period for the second time series; and
setting a period for the cycle component of the consumer leverage time series as the period determined for the second time series;
determine a value of the cycle component of the consumer leverage time series for a particular time; and
an output device operatively connected to the processor and configured to:
output an indication of the value of the cycle component of the consumer leverage time series for the particular time.

11. The apparatus of claim 10, wherein the output device is configured output the indication by:
when a value of the cycle component of the consumer leverage time series is positive for the particular time, providing a predictive indication that consumer net non-collectibles will increase beyond the particular time; and
when a value of the cycle component of the consumer leverage time series is negative for the particular time, provide a predictive indication that consumer net non-collectibles will decrease beyond the particular time.

12. The apparatus of claim 10, wherein the processor models the trend component of the consumer leverage time series using an integrated random walk method.

13. The apparatus of claim 10, wherein the processor models the trend component of the consumer leverage time series by setting an order of the trend component of the consumer leverage time series to two, and wherein the processor models the cycle component of the consumer leverage time series by setting an order of the cycle component of the consumer leverage time series to one.

14. The apparatus of claim 10,
wherein the target economic variable is consumer net non-collectibles (NCO),
wherein the processor is further configured to model, based at least partially on the third data, a net non-collectable time series, wherein the processor models the net non-collectable time series by:
modeling a trend component of the net non-collectable time series; and
modeling a cycle component of the net non-collectable time series, and
wherein the processor models the cycle component of the consumer leverage time series such that the cycle component of the consumer leverage time series leads the cycle component of the net non-collectable time series by at least approximately 16 months.

15. A computer program product comprising a non-transitory computer-readable medium, wherein the non-transitory computer-readable medium comprises one or more computer-executable program code portions that, when executed by a computer, cause the computer to:
   receive first data indicating a value of a total income amount for an aggregate of a plurality of consumers over a period of time;
   receive second data indicating a value of a total debt amount for the aggregate of the plurality of consumers over a period of time;
   receive third data indicating a value of a target economic variable over a period of time;
   select a consumer leverage time series that compares the value of the total income amount for the aggregate of the plurality of consumers to the value of the total debt amount for the aggregate of the plurality of consumers over a period of time;
   select a second time series that tracks the value of the target economic variable over a period of time, wherein changes in the consumers leverage time series serve as a logical leading indicator for changes in the second time series;
   model, based at least partially on the first and the second data, the consumer leverage time series, wherein the computer models the consumer leverage time series by:
      modeling a trend component of the consumer leverage time series; and
      modeling a cycle component of the consumer leverage time series by:
         determining, using a spectral estimation method and based at least partially on the third data, a period for the second time series; and
         setting a period for the cycle component of the consumer leverage time series as the period determined for the second time series;
   determine a value of the cycle component of the consumer leverage time series for a particular time; and
   output an indication of the value of the cycle component of the consumer leverage time series for the particular time.

16. The computer program product of claim 15, wherein the computer outputs the indication by:
   outputting an indication that consumers are over-leveraged if the value of the cycle component of the consumer leverage time series is positive for the particular time;
   outputting an indication that consumers are under-leveraged if the value of the cycle component of the consumer leverage time series is negative for the particular time.

17. The computer program product of claim 15, wherein the one or more computer-executable program code portions, when executed by the computer, cause the computer to:
   receive third data indicating a value of a total net non-collectable (NCO) amount for a plurality of consumers over a period of time; and
   select a net non-collectable time series that tracks the value of the total net non-collectable amount over a period of time, and
   wherein the computer models the cycle component of the consumer leverage time series by:
      determining, based at least partially on the third data, a period for the net non-collectable time series; and
      setting the period for the cycle component of the consumer leverage time series as the period determined for the net non-collectable time series.

18. The computer program product of claim 17, wherein the one or more computer-executable program code portions, when executed by the computer, cause the computer to:
   determine the period for the net non-collectable time series such that the period is approximately 68 months.

19. The computer program product of claim 17, wherein the one or more computer-executable program code portions, when executed by the computer, cause the computer to:
   model, based at least partially on the third data, the net non-collectable time series by:
      modeling a trend component of the net non-collectable time series; and
      modeling a cycle component of the net non-collectable time series, and
   wherein the computer models the cycle component of the consumer leverage time series such that the cycle component of the consumer leverage time series leads the cycle component of the net non-collectable time series by at least approximately 16 months.

* * * * *